(No Model.)
J. E. DENTON.
CHUCK FOR ROCK DRILLS.
No. 318,420. Patented May 19, 1885.
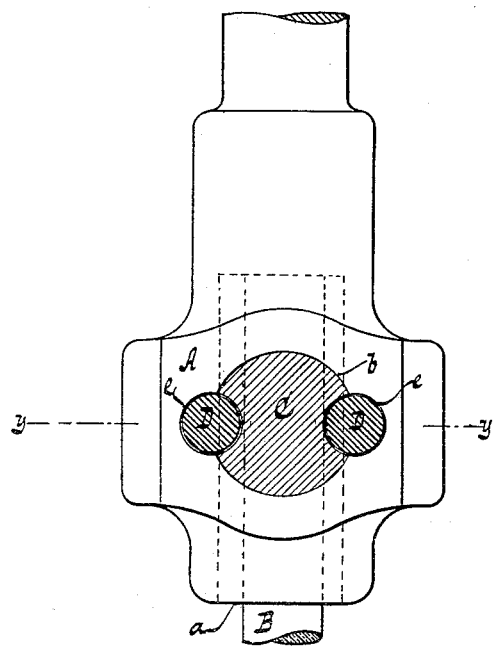
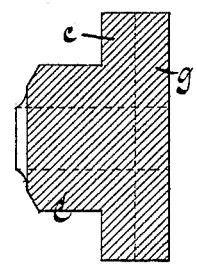
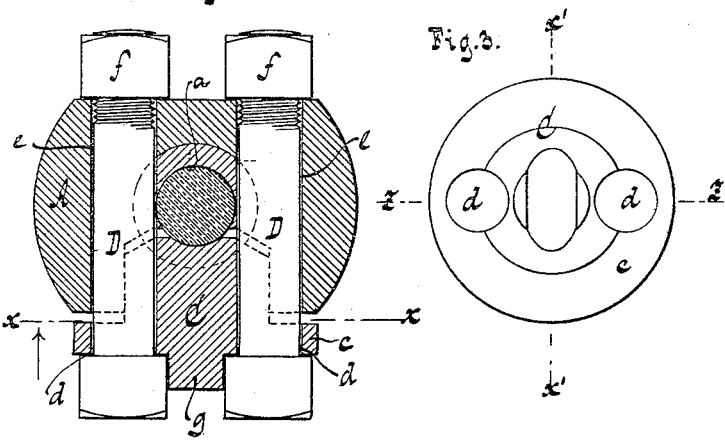
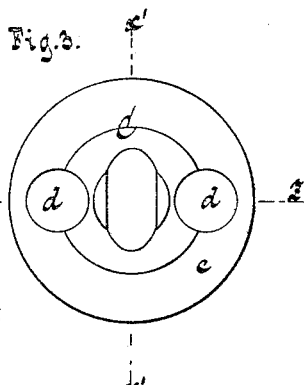
WITNESSES
Otto Hufeland
William Miller
INVENTOR
James E. Denton
by Van Santvoord & Hauff Attorneys

UNITED STATES PATENT OFFICE.

JAMES E. DENTON, OF HOBOKEN, NEW JERSEY.

CHUCK FOR ROCK-DRILLS.

SPECIFICATION forming part of Letters Patent No. 318,420, dated May 19, 1885.

Application filed March 19, 1885. (No model.)

*To all whom it may concern:*

Be it known that I, JAMES E. DENTON, a citizen of the United States, residing at Hoboken, in the county of Hudson and State of New Jersey, have invented new and useful Improvements in Chucks for Rock-Drills and other Articles, of which the following is a specification.

This invention relates to a chuck the head of which is bored out to admit the rod to be clamped, and provided with a jaw which fits a cavity in the side of the head, and two bolts which serve to draw the jaw inward, thereby clamping the rod between the jaw and the rigid, unyielding inner surface of the head. The peculiar and novel construction of my chuck is pointed out in the following specification and claims, and illustrated in the accompanying drawings, in which—

Figure 1 represents a sectional face view, the line $x\,x$, Fig. 2, indicating the plane of section. Fig. 2 is a transverse section in the plane $y\,y$, Fig. 1, the bolts being shown in elevation. Fig. 3 is an inside view of the clamping-jaw detached. Fig. 4 is a central section of the same in the plane $z\,z$, Fig. 3. Fig. 5 is a similar section of the same in the plane $x\,x'$, Fig. 3.

Similar letters indicate corresponding parts.

In the drawings, the letter A designates the head of my chuck. This head may be made integral with the piston-rods, or may be attached thereto. It is, however, of considerably larger size, in order that an aperture may be formed to receive the chuck or clamp, and the entire aperture may be surrounded by the metal of the body of the head of the chuck, in order to secure strength and avoid danger of breakage. This chuck-head A is provided with a socket, $a$, to receive the rod B. This rod represents the article to be clamped, and since my chuck is intended particularly for rock-drills I shall term said rod in the following specification the "drill-rod." In rock-drilling machines it is of the greatest importance to secure the drills in the machines in such a manner that they are not liable to work loose by the constant shocks to which they are exposed whenever their point strikes the rock. This object I have sought to accomplish by means of my chuck.

The drill-rod B fits the socket $a$ snugly, and in the side of the head is a cavity, $b$, Fig. 1, into which is fitted the clamping-jaw C. This jaw is provided with a flange, $c$, and with holes $d\,d$, to receive the bolts D D. These bolts also pass through holes $e\,e$, which extend transversely through the head, and when the nuts $f\,f$ of said bolts are screwed up the drill-rod is clamped between the rigid surface of the head A on one side and the inner surface of the jaw on the opposite side. The heads of the bolts D D are prevented from turning by a rib, $g$, on the outer surface of the jaw C, and the nuts $f\,f$, when drawn up tight, bear against the rigid surface of the head A.

When the drill-rod strikes the rock, violent lateral wrenching is liable to occur at the chuck end, tending to force the jaw C out of the cavity $b$. Thereby the nuts are strained to and fro in the direction of the bolts D D. If the latter were inextensible, or so short as to be practically inextensible, this strain upon the nuts would cause a permanent yielding of the screw-threads sufficient to so far reduce the friction between the inner faces of the nuts and the surface of the head A as to allow the nuts to be quickly unscrewed by the mere jar due to blows delivered upon the rock. If, however, as in the device herein referred to, the bolts, through their considerable length, constitute an elastic medium to transmit the lateral wrenching or strain to the nuts, any permanent yielding of the threads is counteracted by an equal amount of contraction of the bolts, so that the friction between the inner face of the nuts and the surface of the head A is not decreased sufficiently to permit the nuts to unscrew under the jar due to blows upon the rock. If the drill-rod is clamped between two jaws fitted into opposite sides of the head A, the same lateral wrenching caused by the drill striking the rock does not tend to stretch the bolts or to strain the nuts, but the force to lift the drill-rod comes against the flanges of the jaws and the adjacent surfaces of the head; and when these surfaces wear the drill-rod is free to shake back and forward in the direction of its length, whereas in my chuck the drill-rod is held by friction against the bore of the head, and no longitudinal play can ensue.

The body of the jaw C is cylindrical, so that the cavity $b$ in the head A can be produced by a drill, and the body of the jaw can be readily fitted into said cavity. The inner surface of the jaw C is chamfered off, as shown in Figs. 3, 4, and 5, so that the drill-rod, on being pushed into the socket $a$, does not meet a sharp corner, and the operation of inserting said drill-rod can be easily effected.

The socket of the head which is intended to receive the drill-rod may be provided with a bushing, which, when worn, can be renewed.

I am aware that a drill-chuck has been composed of a socketed head to receive one end of the drill, such socket being open at one side to receive a key which is clamped upon the drill-rod by bolts acting on the key and passing through the socketed head. Such, therefore, I do not broadly claim.

What I claim as new, and desire to secure by Letters Patent, is—

1. The combination of the enlarged head A, provided with socket $a$ and aperture $b$, formed in its body and surrounded by the metal of the body, and the chuck or clamp C, provided with flange $c$ and bolt-holes $d$, and the bolts D D, substantially as described.

2. The combination of the enlarged chuck-head A, provided with circular aperture $b$, to receive the chuck or clamp C, and the bolt-holes $e$, the chuck or clamp C made cylindrical in form and fitting into the aperture $b$, and provided with the flange $c$ and bolt-holes $d$, and the bolts, substantially as described.

In testimony whereof I have hereunto set my hand and seal in the presence of two subscribing witnesses.

JAMES E. DENTON. [L. S.]

Witnesses:
W. HAUFF,
E. F. KASTENHUBER.